(12) United States Patent
Kuntz et al.

(10) Patent No.: US 11,142,094 B2
(45) Date of Patent: Oct. 12, 2021

(54) ADAPTER ARRANGEMENT, METHOD FOR THE PRODUCTION THEREOF, MODULAR SYSTEM FOR AN ADAPTER ARRANGEMENT, DRIVE ARRANGEMENT AND METHOD FOR THE PRODUCTION THEREOF, AND VEHICLE SEAT

(71) Applicant: Adient Engineering and IP GmbH, Burscheid (DE)

(72) Inventors: Oliver Kuntz, Wermelskirchen (DE); Christoph Hackmann, Leverkusen (DE); Michael Berres, Cologne (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 129 days.

(21) Appl. No.: 16/341,221

(22) PCT Filed: Oct. 9, 2017

(86) PCT No.: PCT/EP2017/075651
§ 371 (c)(1),
(2) Date: Apr. 11, 2019

(87) PCT Pub. No.: WO2018/069234
PCT Pub. Date: Apr. 19, 2018

(65) Prior Publication Data
US 2019/0255970 A1     Aug. 22, 2019

(30) Foreign Application Priority Data

Oct. 12, 2016 (DE) ..................... 10 2016 219 878.5
Dec. 23, 2016 (DE) ..................... 10 2016 226 144.4

(51) Int. Cl.
*B60N 2/02*       (2006.01)
*B60N 2/06*       (2006.01)
(Continued)

(52) U.S. Cl.
CPC ............. *B60N 2/0232* (2013.01); *B60N 2/06* (2013.01); *B60N 2/16* (2013.01); *B60N 2/22* (2013.01); *B60N 2002/024* (2013.01)

(58) Field of Classification Search
CPC .. B60N 2/0232; B60N 2002/024; B60N 2/06; B60N 2/16; B60N 2/22; B60N 2/165; B60N 2/169
See application file for complete search history.

(56) References Cited

U.S. PATENT DOCUMENTS

| | | | | |
|---|---|---|---|---|
| 4,437,639 A | * | 3/1984 | Stein | ...................... F16M 13/02 248/489 |
| 6,454,235 B1 | * | 9/2002 | O'Banion | ............ A47G 1/1606 248/495 |

(Continued)

FOREIGN PATENT DOCUMENTS

| | | |
|---|---|---|
| CN | 103140370 A | 6/2013 |
| CN | 104638830 A | 5/2015 |

(Continued)

*Primary Examiner* — Christopher Garft
(74) *Attorney, Agent, or Firm* — Marshall & Melhorn, LLC

(57) ABSTRACT

An adapter arrangement (7), fastening a first component (K1) to a second component (K2), includes two adapter elements (7.1, 7.2). The first adapter element (7.1) is configured to be fastened to the first component (K1). The second adapter element (7.2) is configured to be fastened to the second component (K2). The two adapter elements (7.1, 7.2) are positionable in at least two different positions relative to each other and are fastenable to each other. The first adapter element (7.1) is configured as a gear plate (4) for the first component (K1) configured as a an electric drive unit (1) of an adjustment mechanism of a vehicle seat. A method for producing the adapter arrangement (7), a modular system for the adapter arrangement (7), to a drive (Continued)

arrangement (9) and a method for the production thereof, and a vehicle seat (10) are also provided.

7 Claims, 4 Drawing Sheets

(51) Int. Cl.
*B60N 2/16* (2006.01)
*B60N 2/22* (2006.01)

(56) References Cited

U.S. PATENT DOCUMENTS

| | | | | |
|---|---|---|---|---|
| 6,508,347 | B1* | 1/2003 | Hochmuth | B60N 2/2227 |
| | | | | 192/44 |
| 9,279,538 | B1* | 3/2016 | Wening | A47G 1/16 |
| 2004/0099498 | A1* | 5/2004 | Kurita | B60N 2/168 |
| | | | | 192/12 B |
| 2012/0112022 | A1* | 5/2012 | Cheng | A47G 25/10 |
| | | | | 248/205.3 |
| 2013/0333496 | A1* | 12/2013 | Boutouil | F16H 19/08 |
| | | | | 74/89 |
| 2015/0252942 | A1* | 9/2015 | Cheng | F16M 13/022 |
| | | | | 248/220.22 |
| 2016/0280099 | A1* | 9/2016 | Kaku | F16D 51/12 |
| 2017/0253148 | A1* | 9/2017 | Chae | B60N 2/169 |
| 2017/0253149 | A1* | 9/2017 | Chae | B60N 2/168 |
| 2018/0094679 | A1* | 4/2018 | Kaku | F16D 51/12 |
| 2018/0099585 | A1* | 4/2018 | Mikasa | B60N 2/1615 |
| 2018/0154800 | A1* | 6/2018 | Stemmer | B60N 2/165 |
| 2018/0201158 | A1* | 7/2018 | Hoffmann | F16H 1/32 |
| 2018/0345826 | A1* | 12/2018 | Mikasa | F16D 41/066 |
| 2019/0193596 | A1* | 6/2019 | Chae | B60N 2/165 |

FOREIGN PATENT DOCUMENTS

| | | |
|---|---|---|
| CN | 105 059 142 A | 11/2015 |
| CN | 105383337 A | 3/2016 |
| DE | 101 17 405 A1 | 1/2002 |
| DE | 10 2006 005 907 B4 | 11/2007 |
| DE | 20 2007 003713 U1 | 7/2008 |
| DE | 202007003713 U1 | 7/2008 |
| DE | 10 2011 075183 A1 | 3/2012 |
| DE | 202015102543 U1 | 8/2015 |
| DE | 10 2015 215 219 A1 | 3/2016 |
| DE | 102015215219 A1 | 3/2016 |
| EP | 2 261 073 A2 | 12/2010 |
| EP | 2261073 A1 | 12/2010 |
| EP | 2 067 652 B1 | 8/2013 |

\* cited by examiner

ADAPTER ARRANGEMENT, METHOD FOR THE PRODUCTION THEREOF, MODULAR SYSTEM FOR AN ADAPTER ARRANGEMENT, DRIVE ARRANGEMENT AND METHOD FOR THE PRODUCTION THEREOF, AND VEHICLE SEAT

CROSS REFERENCE TO RELATED APPLICATIONS

This application is a United States National Phase Application of International Application PCT/EP2017/075651 filed Oct. 9, 2017, and claims the benefit of priority under 35 U.S.C. § 119 of German Applications 10 2016 219 878.5 filed Oct. 12, 2016 and 10 2016 226 144.4, filed Dec. 23, 2016, the entire contents of which are incorporated herein by reference.

TECHNICAL FIELD

The relates to an adapter arrangement for securing a first component to a second component, a method for the production thereof, a modular system for an adapter arrangement, a drive arrangement and a method for the production thereof and a vehicle seat.

TECHNICAL BACKGROUND

From the prior art, electric drive units for an adjustment mechanism of a vehicle seat, for example, for the electrical height adjustment thereof, are generally known. Such a drive arrangement comprises an electric motor and a gear mechanism. The gear mechanism has a gear plate via which the electric drive unit can be secured to a seat frame of the vehicle seat. This gear plate consequently forms an adapter for securing the electric drive unit to the seat frame of the vehicle seat.

In EP 2 067 652 B1 an adapter element and an adjustment drive having such an adapter element are described. The adapter element can be secured to an end region of a threaded spindle of an immersion spindle drive which has an outer thread. The adapter element is constructed in several parts and has an inner thread element which can be screwed to the outer thread of the threaded spindle and a sleeve element which receives the inner thread element. The sleeve element is constructed and arranged in such a manner that axial tensile and pressure forces acting on the inner thread element can be supported thereon.

SUMMARY

An object of the present invention is to provide an adapter arrangement which is improved compared with the prior art, a method for the production thereof which is improved compared with the prior art, a modular system which is improved compared with the prior art for an adapter arrangement, a drive arrangement which is improved compared with the prior art and a method for the production thereof which is improved compared with the prior art and a vehicle seat which is improved compared with the prior art.

An adapter arrangement for securing a first component to a second component has two adapter elements, wherein the first adapter element is constructed in such a manner that it can be secured to the first component, and the second adapter element is constructed in such a manner that it can be secured to the second component. The two adapter elements can be positioned relative to each other and secured to each other in at least two different relative positions.

According to the invention, the first adapter element is constructed as a gear plate for a first component which is constructed as a drive unit, in particular for an electric drive unit, for example, for an electric drive unit of an adjustment mechanism of a vehicle seat, for example, for the electrical height adjustment thereof and/or longitudinal adjustment and/or seat backrest adjustment. Such an electric drive unit advantageously comprises an electric motor and a gear mechanism. Such an electric drive unit is therefore also referred to as an electric gear motor. The second adapter element is in a particularly preferred manner constructed as a retention plate for a second component which is constructed as a vehicle seat, in particular as a seat frame for the vehicle seat.

In a particularly advantageous embodiment, the two adapter elements can be orientated relative to each other by means of a stepless rotation about a common rotation axis, that is to say, positioned relative to each other, and after an orientation which has been carried out in this manner can be secured to each other. The securing of the adapter elements to each other is carried out, for example, in a materially bonding, form-fitting and/or force-fitting manner, for example, by means of welding of the two adapter elements to each other, in particular by means of laser welding.

In a method according to the invention for producing, in particular for assembling, the adapter arrangement, the two adapter elements are orientated relative to each other, in particular by means of rotation relative to each other about the common rotation axis, in particular in a stepless manner, and secured to each other, for example, in a materially bonding, form-fitting and/or force-fitting manner, for example, by means of welding of the two adapter elements to each other, in particular by means of laser welding.

A modular system according to the invention for such an adapter arrangement comprises at least a first adapter element and at least a second adapter element. Advantageously, the modular system comprises a plurality of different first adapter elements and/or a plurality of different second adapter elements. The plurality of first adapter elements and/or the plurality of second adapter elements differ in this instance in particular in respective securing elements for securing to the respective component, for example, in terms of number, type and/or orientation of the securing elements. It is thereby possible, by means of the adapter arrangement which has been composed from the modular system, to connect different first and second components to each other.

In a particularly preferred manner, the modular system comprises at least a plurality of different second adapter elements which are constructed as a retention plate for vehicle seats, in particular for seat frames of vehicle seats. For example, the modular system may then only have one variant of the first adapter element which is constructed as a gear plate described above. In this manner, it is made possible for an electric drive unit, by selecting the respective second adapter element which is constructed as a retention plate, to be secured to different vehicle seats, in particular to different seat frames.

A drive arrangement according to the invention comprises a first component which is constructed as a drive unit and an adapter arrangement described above. The drive unit is in particular constructed as an electric drive unit, for example, as an electric drive unit for an adjustment mechanism of a vehicle seat, for example, for the electrical height adjustment and/or longitudinal adjustment and/or seat backrest adjustment thereof.

In a method according to the invention for producing, in particular for assembling, such a drive arrangement, the adapter arrangement is connected to the first component which is constructed as a drive unit. In this instance, there may be provision first for the first adapter element to be connected to the drive unit and afterward for the second adapter element, before or after it has been connected to the second component, to be orientated relative to the first adapter element and connected thereto. Alternatively, there may be provision first for the two adapter elements to be orientated relative to each other and connected to each other and afterward for the first adapter element to be connected to the drive unit, before or after the second adapter element is connected to the second component.

A vehicle seat according to the invention comprises such a drive arrangement, wherein the first component which is constructed as a drive unit is secured by means of the adapter arrangement to the vehicle seat, in particular to a seat frame of the vehicle seat, that is to say, to the second component which is constructed as a vehicle seat, in particular as a seat frame of the vehicle seat.

The advantages achieved with the invention involve in particular a first component being able to be secured or being secured to a second component by means of the adapter arrangement. By means of different first adapter elements and/or different second adapter elements, it is in this case made possible for a first component to be secured to different second components and/or different first components to be secured to a second component.

In the preferred embodiment of the first component as an electric drive unit for an adjustment mechanism of a vehicle seat, there is in this instance advantageously provided a variant of the first adapter element which is constructed as a gear plate for the electric drive unit and there are provided different variants of second adapter elements which are constructed as retention plates which are constructed for securing to a respective vehicle seat variant or seat frame variant as a second component. It is thereby advantageously made possible for the electric drive unit to be secured by means of the adapter arrangement and by means of the respective selection of the appropriate second adapter element to vehicle seats which are constructed differently, in particular to the respective seat frame thereof. As a result of the orientation of the adapter elements relative to each other by means of a stepless relative rotation about a common rotation axis and the subsequent securing of the two adapter elements to each other, in this instance an orientation of the electric drive unit which is suitable for the respective vehicle seat is enabled.

As a result of the solution according to the invention, consequently, an interface between the electric drive unit and the seat frame of the vehicle seat, in particular a seat frame side portion of the vehicle seat is optimized, in particular for an adjustment mechanism which is provided for height adjustment of the vehicle seat. As a result of the solution according to the invention, a flexible interface between the electric drive unit and the seat frame, in particular the seat frame side portion, is enabled. The term "flexible" is intended to mean in this instance that the interface can be adapted using the solution according to the invention to different seat frames, in particular seat frame side portions. The drive unit or the drive arrangement which comprises the drive unit and at least the first adapter element of the adapter arrangement forms in this instance a standardized and verifiable unit which can be used across projects and which receives in a subsequent process an adaptation member which is project-specific, that is to say, adapted to the respective vehicle seat, in particular to the seat frame thereof, in the form of the adapter arrangement or in the form of the second adapter element.

The securing of the adapter arrangement, in particular the first adapter element, to the first component can be carried out in a form-fitting manner, force-fitting manner and/or materially bonding manner, for example, by means of screwing.

The securing of the adapter arrangement, in particular the second adapter element, to the second component can be carried out in a form-fitting manner, force-fitting manner and/or materially bonding manner, for example, by means of screwing.

For example, the adapter elements, in order to ensure a stable abutment of the two adapter elements against each other, are constructed at least outside securing elements for securing to the gear mechanism or to the vehicle seat or at least outside securing element regions around these securing elements, in a flat or at least substantially flat manner. In particular at least a respective abutment face of the respective adapter element which the abutment face of the respective other adapter element abuts after the connection and in particular also already during connection of the adapter elements is constructed to be flat, at least substantially flat. In particular, the welding of the two adapter elements, for example, by means of laser welding, is thereby also facilitated and a stable connection is achieved.

Embodiments of the invention are explained in greater detail below with reference to drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
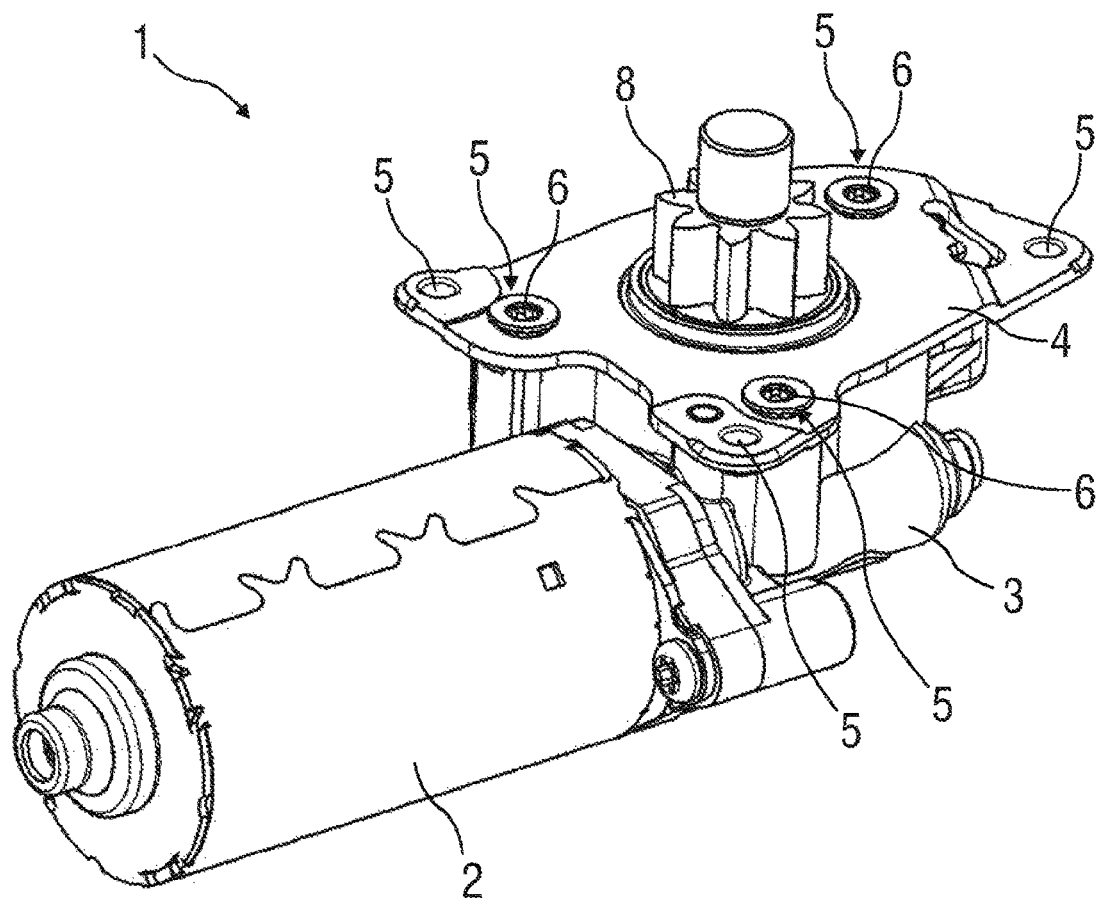
FIG. 1 is a schematic, perspective illustration of an electric drive unit known from the prior art.

Referring to the drawings, corresponding components are given the same reference numerals in all the Figures.

Figure 5:
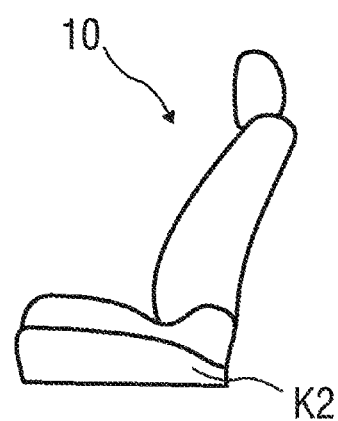
FIG. 5 is a schematic illustration of a vehicle seat.

FIG. 1 shows an electric drive unit 1 known from the prior art for an adjustment mechanism of a vehicle seat 10 which is illustrated in FIG. 5, for example, for the electrical height adjustment and/or longitudinal adjustment and/or seat backrest adjustment thereof. The electric drive unit 1 comprises an electric motor 2 and a gear mechanism 3. Such an electric drive unit 1 is therefore also referred to as an electric gear motor.

A gear plate 4 of the electric drive unit 1 comprises securing elements 5 which are constructed as screw holes and via which it is secured by means of securing screws 6 to a gear housing of the electric drive unit 1, and other securing elements 5 for securing to a seat frame, in particular to a seat frame side portion, of the vehicle seat 10. That is to say, the electric drive unit 1 can be secured by means of this gear plate 4 to the seat frame of the vehicle seat 10.

The disadvantage in this instance is that both the securing elements 5 for securing the gear plate 4 to the gear housing and the securing elements 5 for securing the gear plate 4 to the seat frame of the vehicle seat 10 are fixedly predetermined. A change in particular of the position thereof is not possible. Consequently, only one fixedly predetermined securing of the gear plate 4 and consequently of the electric drive unit 1 to the seat frame of the vehicle seat 10 is also possible. There are no possible ways of changing the position in order to be able to, for example, assemble the electric drive unit 1 in a simple manner on differently constructed seat frames.

Figure 2:
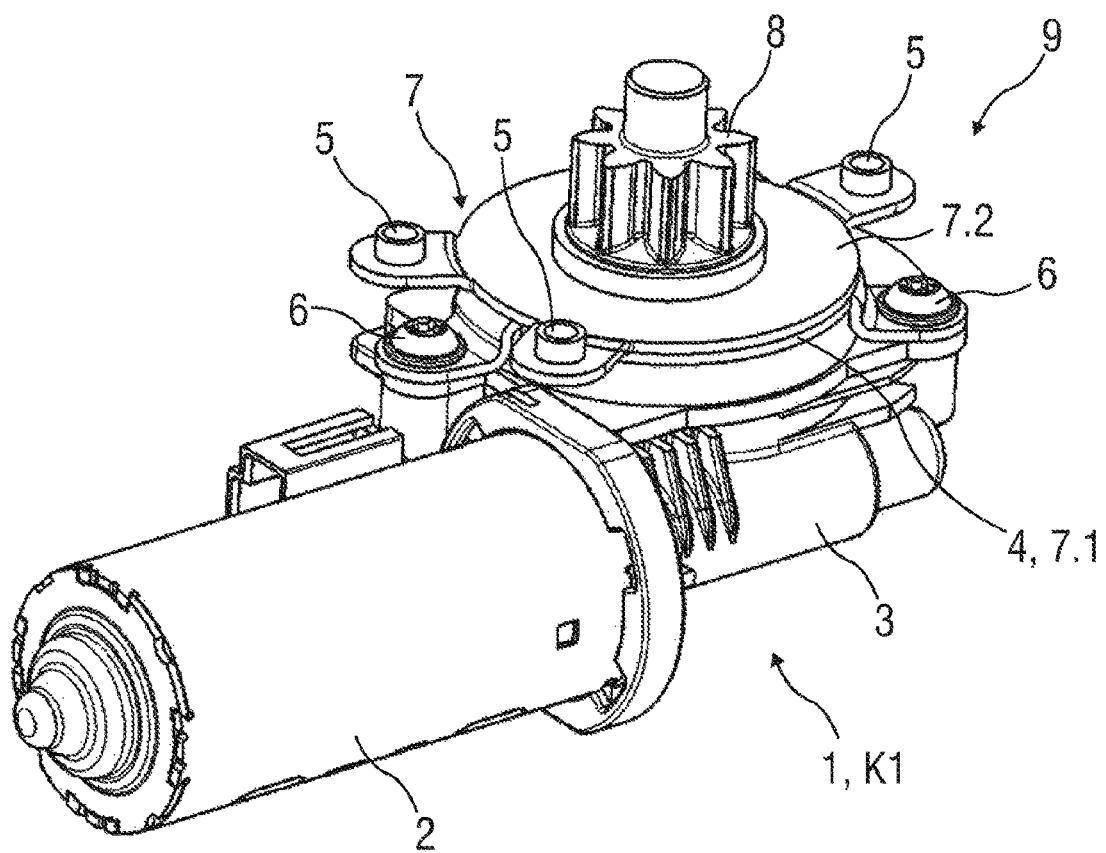
FIG. 2 is a schematic, perspective illustration of a drive arrangement.

As a result of the solution described with reference to FIGS. 2 to 4, this disadvantage is overcome by means of the use of an adapter arrangement 7. This adapter arrangement 7 serves to secure a first component K1, in this instance the electric drive unit 1, comprising the electric motor 2 and the gear mechanism 3, to a second component K2, which is constructed in this example as the vehicle seat 10 illustrated in FIG. 5, more specifically the seat frame, in particular seat frame side portion thereof.

This adapter arrangement 7 has two adapter elements 7.1, 7.2. The first adapter element 7.1 is constructed in the example illustrated in this instance as a gear plate 4 for the electric drive unit 1. The second adapter element 7.2 is constructed as a retention plate for the second component K2 which is constructed as a seat frame, in particular seat frame side portion, of the vehicle seat 10. The retention plate is, for example, constructed as an adaptation sheet.

In the embodiment described in this instance in which the electric drive unit 1 is intended to be secured to the seat frame, this second adapter element 7.2 is constructed to be application-specific, that is to say, the construction thereof is adapted to the construction of the region of the seat frame to which it is intended to be secured. Consequently, this described solution makes it possible to mount the electric drive unit 1 on differently constructed vehicle seats 10, more specifically on the respective seat frame thereof. To this end, only the use of a second adapter element 7.2 which is provided for the respective seat frame 10 and the seat frame thereof is required. No adaptations are consequently required to the electric drive unit 1 and the first adapter element 7.1 which is constructed as the gear plate 4 thereof.

A modular system for constructing different adapter arrangements 7 which are suitable for the respective vehicle seat 10 and the seat frame thereof therefore advantageously comprises at least a first adapter element 7.1 in the form of the gear plate 4 and a plurality of different second adapter elements 7.2 in the form of retention plates for the respective vehicle seat 10 and the seat frame thereof to which the electric drive unit 1 is intended to be secured.

The first adapter element 7.1, that is to say, the gear plate 4, is in this instance constructed as a standardized adaptation sheet, that is to say, as a standardized gear plate 4 which in order to complete the electric drive unit 1 is secured to the gear housing. The electric drive unit 1 is thereby constructed as a verifiable unit which for arrangement on differently constructed vehicle seats 10, more specifically on the seat frame thereof, does not have to be changed.

The securing of this first adapter element 7.1 in the form of the gear plate 4 to the electric drive unit 1, advantageously to the gear housing, can be carried out in a form-fitting, materially bonding and/or force-fitting manner, for example, by means of at least one securing screw 6. In the example illustrated in this instance, this securing is carried out by means of three screw connections, that is to say, by means of three securing screws 6. To this end, the first adapter element 7.1 which is constructed as a gear plate 4 has corresponding securing elements 5 in the form of screw holes. The gear housing of the gear mechanism 3 is, for example, constructed from plastics material.

The first adapter element 7.1 which is constructed as a gear plate 4 is constructed in the example shown in an annular manner in order to be able to guide a toothed wheel 8 of the gear mechanism 3 via which the electric drive unit 1 can be coupled to the adjustment mechanism of the vehicle seat through the gear plate 4. The second adapter element 7.2 in the example illustrated is for the same reason also formed in an annular manner.

Figure 3:
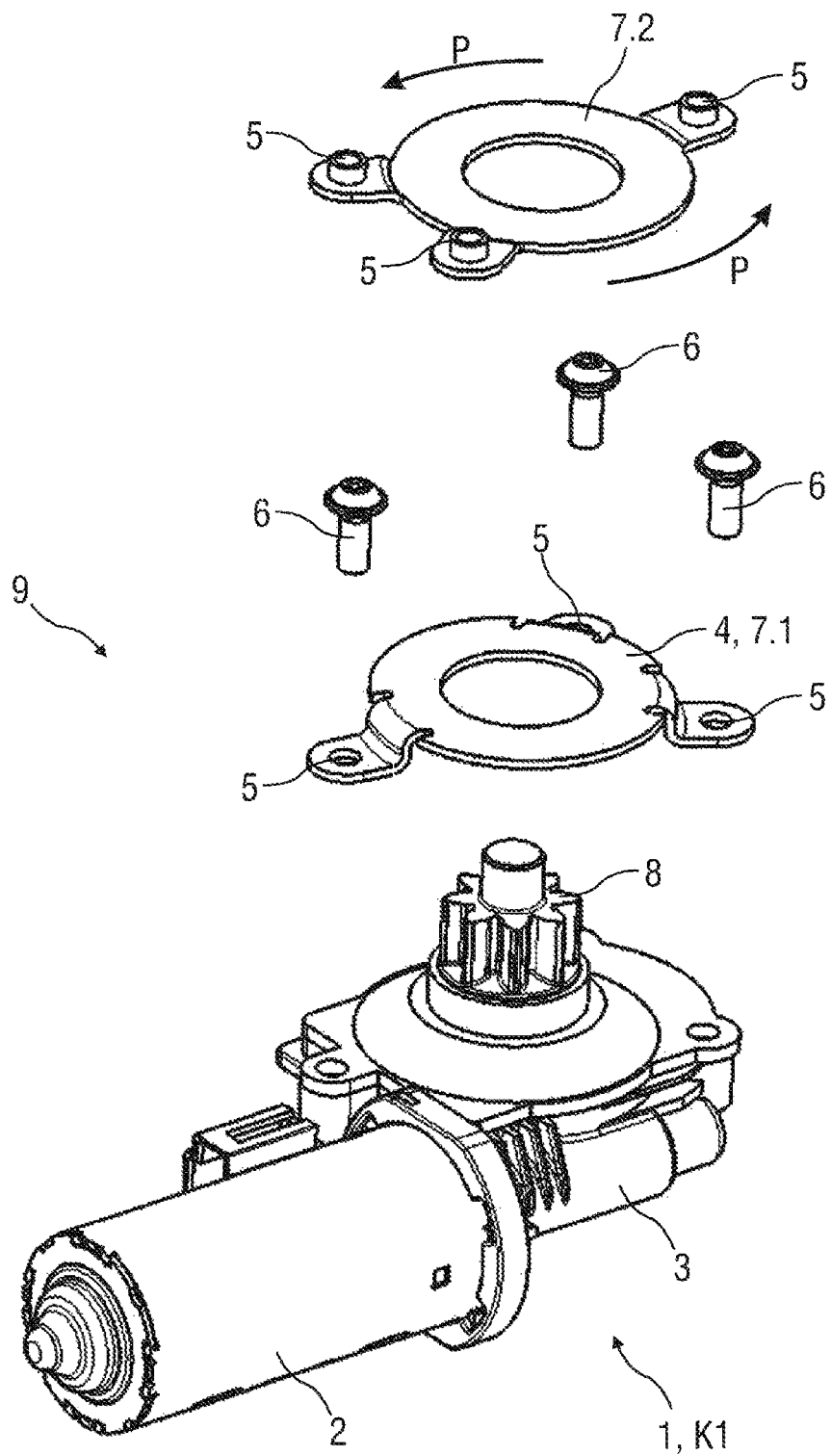
FIG. 3 is a schematic, partially exploded illustration of a drive arrangement.
Figure 4:
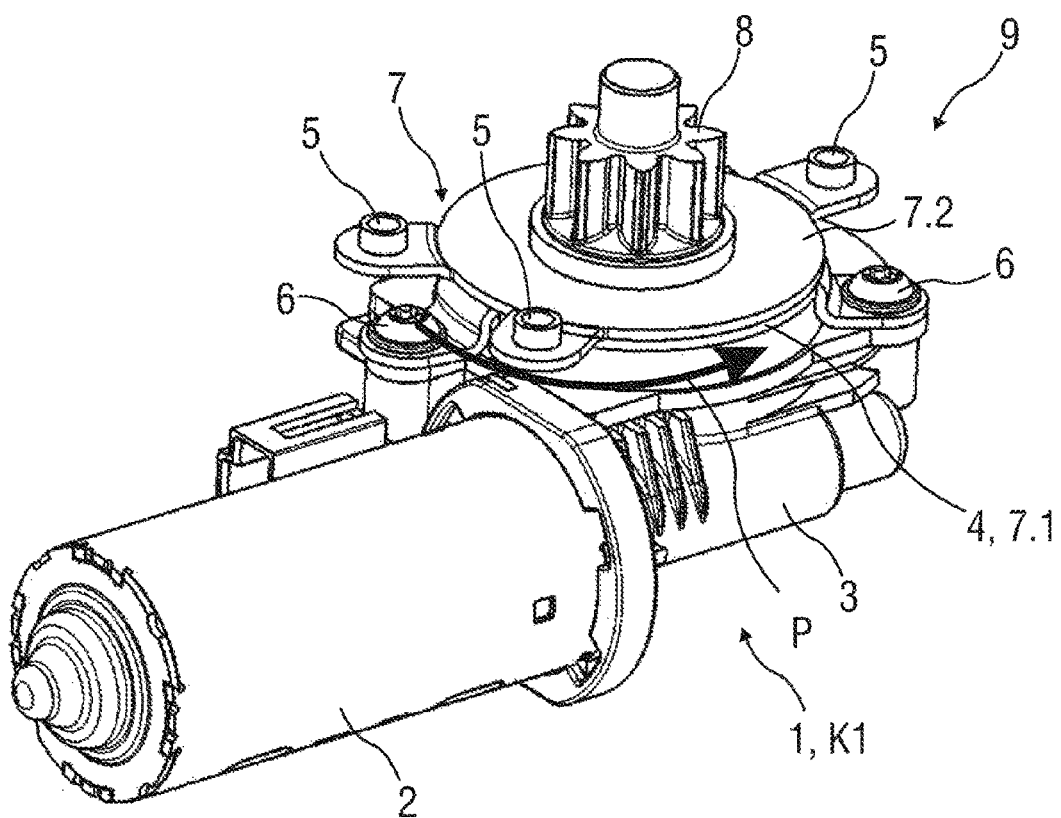
FIG. 4 is a schematic illustration of method for producing a drive arrangement.

In a particularly advantageous embodiment, the assembly of the adapter arrangement 7, as shown in FIGS. 3 and 4, is carried out by the second adapter element 7.2 being rotated about a common rotation axis of the two adapter elements 7.1, 7.2, which is formed in this instance by the toothed wheel 8, relative to the first adapter element 7.1. That is to say, there is produced a stepless orientation of the second adapter element 7.2 by means of the stepless rotation thereof, that is to say, by a stepless rotation angle change, relative to the first adapter element 7.1 and thereby relative to the electric drive unit 1, as indicated in FIGS. 3 and 4 by means of rotational arrows P. It is thereby possible to change a position of the second adapter element 7.2 and in particular the securing element 5 thereof or a plurality of securing elements 5 relative to the first adapter element 7.1 and consequently relative to the electric drive unit 1. In this manner, a position and orientation of the electric drive unit 1 relative to the vehicle seat 10 and the seat frame thereof, in particular seat frame side portion, to which the electric drive unit 1 is intended to be secured by means of the second adapter element 7.2 can be changed.

The adapter arrangement 7 enables in this manner an adaptation of the position and orientation of the electric drive unit 1 to the respective vehicle seat 10 and the seat frame thereof, in particular to the seat frame side portion and a securing region to which the electric drive unit 1 can be secured by means of the securing elements 5 or the at least one securing element 5 of the second adapter element 7.2. That is to say, the orientation of the drive unit 1 can be adjusted in a stepless manner with respect to an angular position of the electric motor 2 relative to the vehicle seat 10, in particular the seat frame and the seat frame side portion thereof.

After finished orientation of the second adapter element 7.2 relative to the first adapter element 7.1 in the manner described, the second adapter element 7.2 is secured to the first adapter element 7.1. This is advantageously carried out as the last assembly step for forming a drive arrangement 9, which then comprises the electric drive unit 1 and the adapter arrangement 7. As a result of this securing of the two adapter elements 7.1, 7.2 to each other, a fixed connection between the adapter elements 7.1, 7.2 is formed so that a secure fixing of the electric drive unit 1 to the vehicle seat 10 is enabled by means of the adapter arrangement 7 and a position change after fixing is prevented. This connection of the two adapter elements 7.1, 7.2 may, for example, be carried out in a materially bonding manner, form-fitting manner and/or force-fitting manner, for example, by means of welding, in particular by means of laser welding. To this end, the two adapter elements 7.1, 7.2 are advantageously constructed from metal. Alternatively, for example, a construction from plastics material or from a metal/plastics material combination would be possible. A construction of the two adapter elements 7.1, 7.2 from different materials in each case would also be possible.

This materially bonding connection, for example, by means of welding, has the advantage that no corresponding securing units have to be prepared on the two adapter elements 7.1, 7.2 which for connection would have to accordingly be positioned relative to each other. As a result of the materially bonding connection, in particular by means of welding, a stepless orientation by means of stepless rotation of the second adapter element 7.2 relative to the first adapter element 7.1 is enabled, wherein the materially bonding connection of the two adapter elements 7.1, 7.2, in particular by means of welding, is possible in any possible rotation position about the common rotation axis.

In order to ensure a stable abutment of the two adapter elements 7.1, 7.2 against each other, the adapter elements 7.1, 7.2 are constructed at least outside the securing elements 5 or at least outside securing element regions around the securing elements 5 to be flat or at least substantially flat. In particular, at least a respective abutment face of the respective adapter element 7.1, 7.2, which the abutment face of the respective other adapter element 7.2, 7.1 abuts after the connection and in particular also during the connection of the adapter elements 7.1, 7.2, is constructed to be flat, at least substantially flat. In particular also the welding of the two adapter elements 7.1, 7.2, for example, by means of laser welding, is thereby facilitated and a stable connection is achieved.

After the securing of the two adapter elements 7.1, 7.2, the drive arrangement 9 which is thereby formed can then be secured to the respective vehicle seat 10, in particular to the seat frame, for example, the seat frame side portion, for example, in a materially bonding manner, form-fitting manner and/or force-fitting manner. The at least one securing element 5 or the plurality of securing elements 5 on the second adapter element 7.2 is/are constructed accordingly to this end in order to enable a connection to the vehicle seat 10.

The solution described consequently makes it possible to secure the electric drive unit 1 to differently constructed vehicle seats 10, more specifically, to differently constructed seat frames, in particular seat frame side portions. In the simplest case, only a corresponding relative orientation of the two adapter elements 7.1, 7.2 to each other by means of rotation of the second adapter element 7.2 relative to the first adapter element 7.1 before securing the two adapter elements 7.1, 7.2 to each other is required for this. The position and orientation of the electric drive unit 1 which it assumes in the installed state on the respective vehicle seat 10 can thereby be adapted to the respective vehicle seat 10.

If other adaptations are required, for example, as a result of another required number and/or another required orientation and/or another required construction of the securing elements 5 to the second adapter element 7.2 for securing to the respective vehicle seat 10, the selection of a second adapter element 7.2 which is constructed in a suitable manner for the respective vehicle seat 10 from the above-mentioned modular system is required. That is to say, even in this instance, by means of the described solution, it is only necessary to adapt the second adapter element 7.2 to the respective vehicle seat 10 in order to be able to assemble the electric drive unit 1 on differently constructed vehicle seats 10. Adaptations to the electric drive unit itself, including the gear plate 4 thereof, as a first adapter element 7.1, and/or adaptations to the respective vehicle seat 10 are not required.

With the described solution, consequently, the gear plate 4 which is shown in FIG. 1 is divided in two in order to thereby form the adapter arrangement 7 and enable an adaptation by means of a second adapter element 7.2 which is application-specific, that is to say, adapted to a respective vehicle seat construction, and additionally to enable an orientation change of the electric drive unit 1 by rotating the adapter elements 7.1, 7.2 relative to each other before they are secured to each other.

The particular advantage of the solution described involves, independently of the application, that is to say, regardless of the vehicle seat 10 on which the electric drive unit 10 is intended to be mounted, a gear mechanism 3 is produced as a verifiable unit by means of placing the gear plate 4, which forms the first adapter element 7.1, on the gear housing. In a subsequent operating step which can be carried out in the same assembly line or at another location, as a result of the arrangement, orientation and securing of the second adapter element 7.2 the application-specific position and orientation of the adapter arrangement 7 and consequently of the entire drive arrangement 9 with respect to the seat frame, in particular seat frame side position, of the respective vehicle seat 10 is then adjusted.

As an alternative to the above-described assembly sequence, other assembly sequences would also be possible. For example, the two adapter elements 7.1, 7.2 could initially be orientated relative to each other and secured to each other and then secured to the electric drive unit 1 and subsequently to the vehicle seat 10 or to the vehicle seat 10 and afterward to the electric drive unit 1. Alternatively, the second adapter element 7.2 could be secured to the vehicle seat 10 first, the first adapter element 7.1 subsequently orientated relative to the second adapter element 7.2 and secured thereto and afterward the electric drive unit 1 secured to the adapter arrangement 7. Alternatively, the first adapter element 7.1, as described above, could be secured to the electric drive unit 1 or at least to the gear mechanism 3, the second adapter element 7.2 secured to the vehicle seat 10 and then the two adapter elements 7.1, 7.2 orientated relative to each other and secured to each other.

The electric motor 2 can be secured in different stages of assembly to the gear mechanism 3, for example, before or after securing the first adapter element 7.1 or the adapter arrangement 7 to the gear mechanism 3 or afterward. It is also possible to first secure the electric motor 2 to the gear mechanism 3 after it has already been secured to the vehicle seat 10 via the adapter arrangement 7.

While specific embodiments of the invention have been shown and described in detail to illustrate the application of the principles of the invention, it will be understood that the invention may be embodied otherwise without departing from such principles.

The invention claimed is:

1. An adapter arrangement for securing a first component to a second component, comprising:
   a first adapter element having a plate with an inner and outer surface and a first plurality of securing elements extending from a perimeter of the first adapter element plate; and
   a second adapter element, said second adapter element having a plate with an inner and an outer surface and a second plurality of securing elements extending from a perimeter of the second adapter element plate, wherein the first adapter element is constructed to be secured to the first component by a first set of screws extending through said securing elements of said first adapter element and into the first component, wherein the second adapter element is constructed to be secured to the second component by a second set of screws extending through said securing elements of said second adapter element and into the second component, and wherein said inner surface of said first adapter element plate is adapted to directly contact said second adapter element plate inner surface, wherein the two adapter elements can be positioned relative to each other and secured to each other in at least two different relative positions, wherein the first adapter element is constructed as a gear plate for the first component which is constructed as an electric drive unit of an adjustment mechanism of a vehicle seat;

wherein the two adapter elements are secured to each other by a weld.

2. The adapter arrangement as claimed in claim 1, wherein the second adapter element is constructed as a retention plate for the second component which is constructed a seat frame for the vehicle seat.

3. The adapter arrangement as claimed in claim 1, wherein the two adapter elements are positionable relative to each other by means of a stepless rotation about a common rotation axis.

4. A method for assembling an adjustment mechanism of a vehicle seat, the method comprising the steps of:

providing a first adapter element secured to a drive unit of the adjustment mechanism, said first adapter element having a plate with an inner and outer surface and a first plurality of securing elements extending from a perimeter of the first adapter element plate;

locating a first set of screws through said first plurality of securing elements of said first adapter element and into the drive unit to secure the drive unit and the first adapter element together;

providing a second adapter element secured to a vehicle seat of the adjustment mechanism, said second adapter element having a plate with an inner and outer surface and a second plurality of securing elements extending from a perimeter of the second adapter element plate;

locating a second set of screws through said second plurality of securing elements of said second adapter element and into the vehicle seat to secure the vehicle seat and the second adapter element together;

wherein the first adapter element and the second adapter elements can be positioned relative to each other and secured to each other in at least two different relative positions and the first adapter element is constructed as a gear plate;

orienting the two adapter elements relative to each other; and securing the two adapter elements to each other;

wherein said inner surface of said first adapter element plate is adapted to directly contact said second adapter element plate inner surface.

5. A modular system, the modular system comprising:

a first adapter element secured to a drive unit of an adjustment mechanism of a vehicle seat, said first adapter element having a plate with an inner and outer surface, wherein said first adapter element has a first plurality of securing elements extending from a perimeter of the first adapter element plate; and at least a second adapter element secured to a vehicle seat of the adjustment mechanism, said second adapter element having a plate with an inner and outer surface, wherein said second adapter element has a second plurality of securing elements extending from a perimeter of the second adapter element plate;

wherein the first adapter element and the at least one second adapter element are positionable relative to each other and securable to each other in at least two different relative positions and the first adapter element is constructed as a gear plate, wherein the first adapter element is secured to the drive unit by a first set of screws extending through said first plurality of securing elements of said first adapter element and into the drive unit, wherein the second adapter element is secured to the vehicle seat by a second set of screws extending through said second plurality of securing elements of said second adapter element and into the vehicle seat, wherein said inner surface of said first adapter element plate is adapted to directly contact said second adapter element plate inner surface.

6. An adapter arrangement according to claim 1, wherein the first component which is constructed as a drive unit is secured by means of the adapter arrangement to the second component which is constructed as a seat frame of the vehicle seat.

7. An adapter arrangement according to claim 1, wherein said perimeters are of substantially equal size and shape.

\* \* \* \* \*